US012633583B1

(12) United States Patent
Post et al.

(10) Patent No.: US 12,633,583 B1
(45) Date of Patent: May 19, 2026

(54) PREDICTIVE BATTERY FAILURE DETECTION SYSTEM

(71) Applicant: Samsara Inc., San Francisco, CA (US)

(72) Inventors: Erin Walker Post, Des Moines, IA (US); Tongan Cai, State College, PA (US); Sarthak Rajvanshi, Brookline, MA (US); Charlotte Gils, Otterburn Park (CA); Charles Edwin Ashton Brett, New York, NY (US); Jan Lester Geronimo Lopez, Brooklyn, NY (US); Mayank Nayar, Renton, WA (US); Eric Greenwald, Littleton, CO (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/243,340

(22) Filed: Jun. 19, 2025

(51) Int. Cl.
*H01M 10/42* (2006.01)
*H01M 10/48* (2006.01)

(52) U.S. Cl.
CPC ..... *H01M 10/4285* (2013.01); *H01M 10/488* (2013.01); *H01M 2220/20* (2013.01)

(58) Field of Classification Search
CPC ........... H01M 10/4285; H01M 10/488; H01M 2220/20
See application file for complete search history.

(56) References Cited

U.S. PATENT DOCUMENTS

| | | | |
|---|---|---|---|
| 2012/0029852 A1* | 2/2012 | Goff | G01R 31/371 |
| | | | 702/63 |
| 2014/0372013 A1* | 12/2014 | Shimizu | F02N 11/108 |
| | | | 701/112 |
| 2021/0088018 A1* | 3/2021 | Imanaka | F02N 11/0862 |

* cited by examiner

*Primary Examiner* — Hussein Elchanti
(74) *Attorney, Agent, or Firm* — Schwegman Lundberg & Woessner, P.A.

(57) ABSTRACT

A system and method for predicting vehicle battery failures includes maintaining a rolling buffer of voltage data from a vehicle and analyzing the data during engine state transitions. The system detects transitions from engine off to on states and analyzes voltage data from a predetermined time period preceding the transition to identify minimum voltage values. These values are compared against configurable threshold voltages to assess battery health. The system generates time series models from historical voltage data to predict future voltage values and potential battery failures. The system generates customized alerts through a graphical user interface indicating predicted time until battery failure and recommended maintenance actions.

18 Claims, 8 Drawing Sheets

300

MAINTAINING A ROLLING BUFFER OF VOLTAGE DATA FROM A VEHICLE
302

DETECTING AN ENGINE STATE TRANSITION FROM OFF TO ON
304

ANALYZING THE VOLTAGE DATA FROM THE ROLLING BUFFER FOR A PREDETERMINED TIME PERIOD PRECEDING THE DETECTED ENGINE STATE TRANSITION
306

IDENTIFYING A MINIMUM VOLTAGE FROM THE ANALYZED VOLTAGE DATA
308

PERFORMING A COMPARISON OF THE MINIMUM VOLTAGE VALUE AGAINST A PREDETERMINED THRESHOLD VOLTAGE VALUE
310

CAUSING DISPLAY OF AN ALERT BASED ON THE COMPARISON
312

200

BATTERY HEALTH PREDICTION SYSTEM
124

PROCESSORS
210

DATA COLLECTION MODULE 202

ANALYSIS MODULE 204

PREDICTION MODULE 206

ALERT GENERATION MODULE 208

300

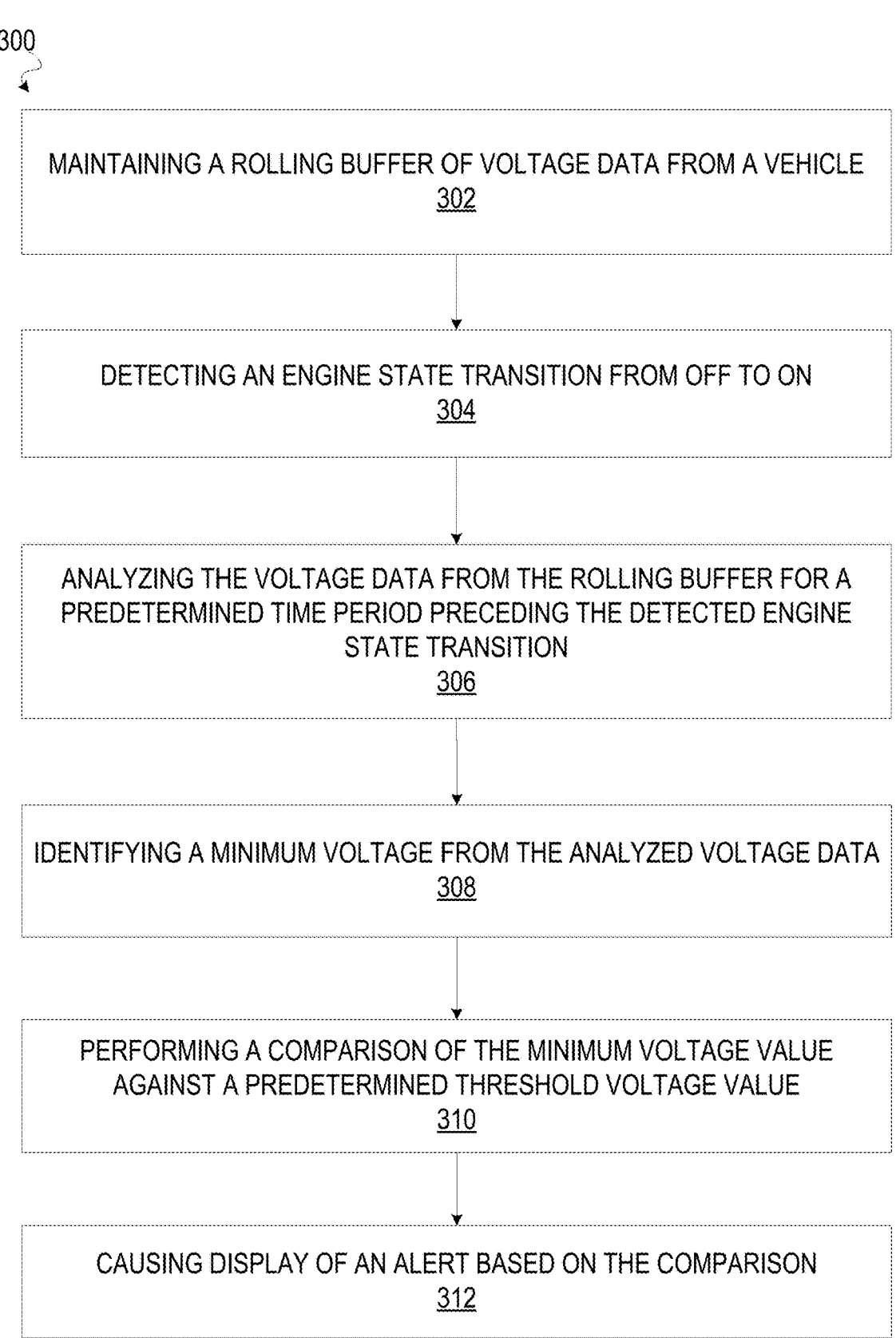

MAINTAINING A ROLLING BUFFER OF VOLTAGE DATA FROM A VEHICLE
302

DETECTING AN ENGINE STATE TRANSITION FROM OFF TO ON
304

ANALYZING THE VOLTAGE DATA FROM THE ROLLING BUFFER FOR A PREDETERMINED TIME PERIOD PRECEDING THE DETECTED ENGINE STATE TRANSITION
306

IDENTIFYING A MINIMUM VOLTAGE FROM THE ANALYZED VOLTAGE DATA
308

PERFORMING A COMPARISON OF THE MINIMUM VOLTAGE VALUE AGAINST A PREDETERMINED THRESHOLD VOLTAGE VALUE
310

CAUSING DISPLAY OF AN ALERT BASED ON THE COMPARISON
312

*FIG. 3*

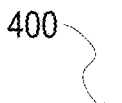
400
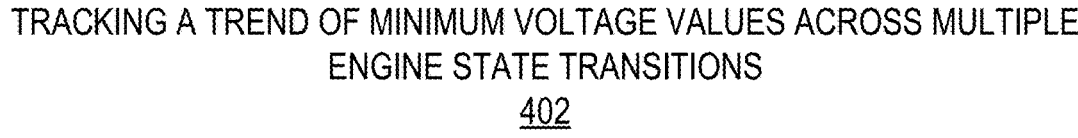
TRACKING A TREND OF MINIMUM VOLTAGE VALUES ACROSS MULTIPLE
ENGINE STATE TRANSITIONS
402
GENERATING THE ALERT BASED ON THE TREND
404
*FIG. 4*

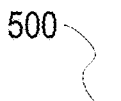
500
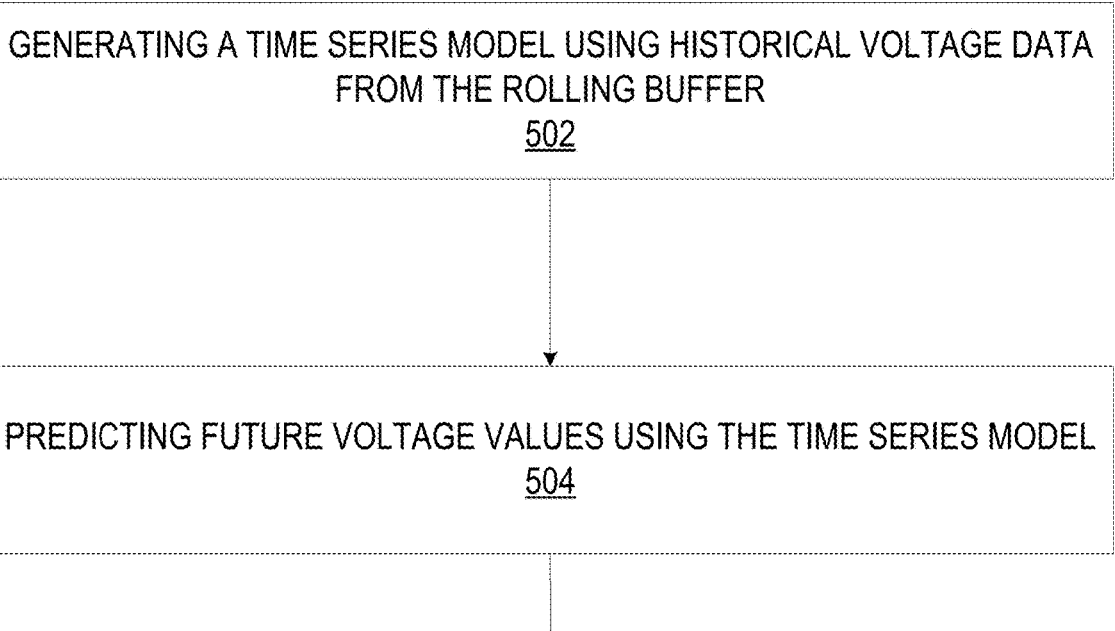
GENERATING A TIME SERIES MODEL USING HISTORICAL VOLTAGE DATA
FROM THE ROLLING BUFFER
502
PREDICTING FUTURE VOLTAGE VALUES USING THE TIME SERIES MODEL
504
DETERMINING A PREDICTED TIME PERIOD UNTIL BATTERY FAILURE
BASED ON THE PREDICTED FUTURE VOLTAGE VALUES
506
*FIG. 5*

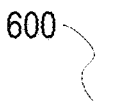

600

```
┌─────────────────────────────────────────────────────────────────────┐
│     DETECTING CONSECUTIVE VOLTAGE READINGS BELOW A MONITORING         │
│         THRESHOLD DURING AN ENGINE-OFF STATE                          │
│                           602                                         │
└─────────────────────────────────────────────────────────────────────┘
                                  │
                                  ▼
┌─────────────────────────────────────────────────────────────────────┐
│  INITIATING A PREDICTIVE ANALYSIS OF THE VOLTAGE DATA IN RESPONSE     │
│         TO DETECTING THE CONSECUTIVE VOLTAGE READINGS                 │
│                           604                                         │
└─────────────────────────────────────────────────────────────────────┘
                                  │
                                  ▼
┌─────────────────────────────────────────────────────────────────────┐
│    DETERMINING A PREDICTED TIME PERIOD UNTIL BATTERY FAILURE          │
│         BASED ON THE PREDICTIVE ANALYSIS                              │
│                           606                                         │
└─────────────────────────────────────────────────────────────────────┘
```

PREDICTIVE BATTERY FAILURE DETECTION SYSTEM

TECHNICAL FIELD

Embodiments of the present disclosure relate generally to vehicle maintenance systems and fleet management technologies. The field encompasses diagnostic and monitoring systems used in transportation and automotive applications. This field includes telematics systems that collect and process operational data from vehicles to support maintenance activities.

BACKGROUND

Vehicle fleet operators face significant operational challenges and costs due to unexpected vehicle breakdowns and maintenance issues. One of the most common and disruptive issues in fleet operations is battery and electrical system failures, which can leave vehicles stranded and require costly emergency repairs or towing services.

For example, vehicle battery issues can be categorized into two distinct types requiring different detection approaches. Battery drain occurs when a battery has insufficient charge to start the vehicle but the battery chemistry remains functional-such batteries can often be restored through charging or jump-starting. Battery deterioration, in contrast, occurs when the battery chemistry has degraded and the battery can no longer hold adequate charge, requiring replacement regardless of charging attempts.

Traditional maintenance approaches rely on scheduled inspections and reactive repairs after failures occur. These approaches often result in unnecessary maintenance costs when components are replaced too early, or expensive roadside repairs and operational disruptions when components fail unexpectedly. Current battery testing methods, such as load testing, require vehicles to be taken out of service for manual inspection, which increases downtime and operational costs.

Existing solutions for monitoring vehicle battery health typically rely on basic voltage measurements taken during routine maintenance checks or simple threshold-based warning systems. These methods often fail to provide adequate advance warning of impending failures, as they do not account for the complex relationships between various operational parameters that indicate battery deterioration.

Furthermore, conventional battery monitoring systems are limited by their inability to capture and analyze high-resolution data during critical events such as engine starts. This limitation makes it difficult to accurately assess battery health and predict potential failures before they occur. The challenge is compounded by the fact that battery performance can be affected by numerous factors including temperature, usage patterns, and vehicle-specific characteristics.

Fleet operators currently lack effective tools to proactively identify and address potential battery and electrical system failures before they result in vehicle breakdowns. This gap in capability leads to increased maintenance costs, reduced fleet reliability, and significant operational disruptions.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flowchart depicting a method of battery health prediction performed by the battery health prediction system and its component modules, according to certain examples.

FIG. 4 is a flowchart depicting a method of tracking voltage trends performed by the battery health prediction system, according to certain examples.

FIG. 5 is a flowchart depicting a method of generating time series predictions performed by the battery health prediction system, according to certain examples.

FIG. 6 is a flowchart depicting a method of initiating predictive analysis performed by the battery health prediction system, according to certain examples.

DETAILED DESCRIPTION

Figure 1:
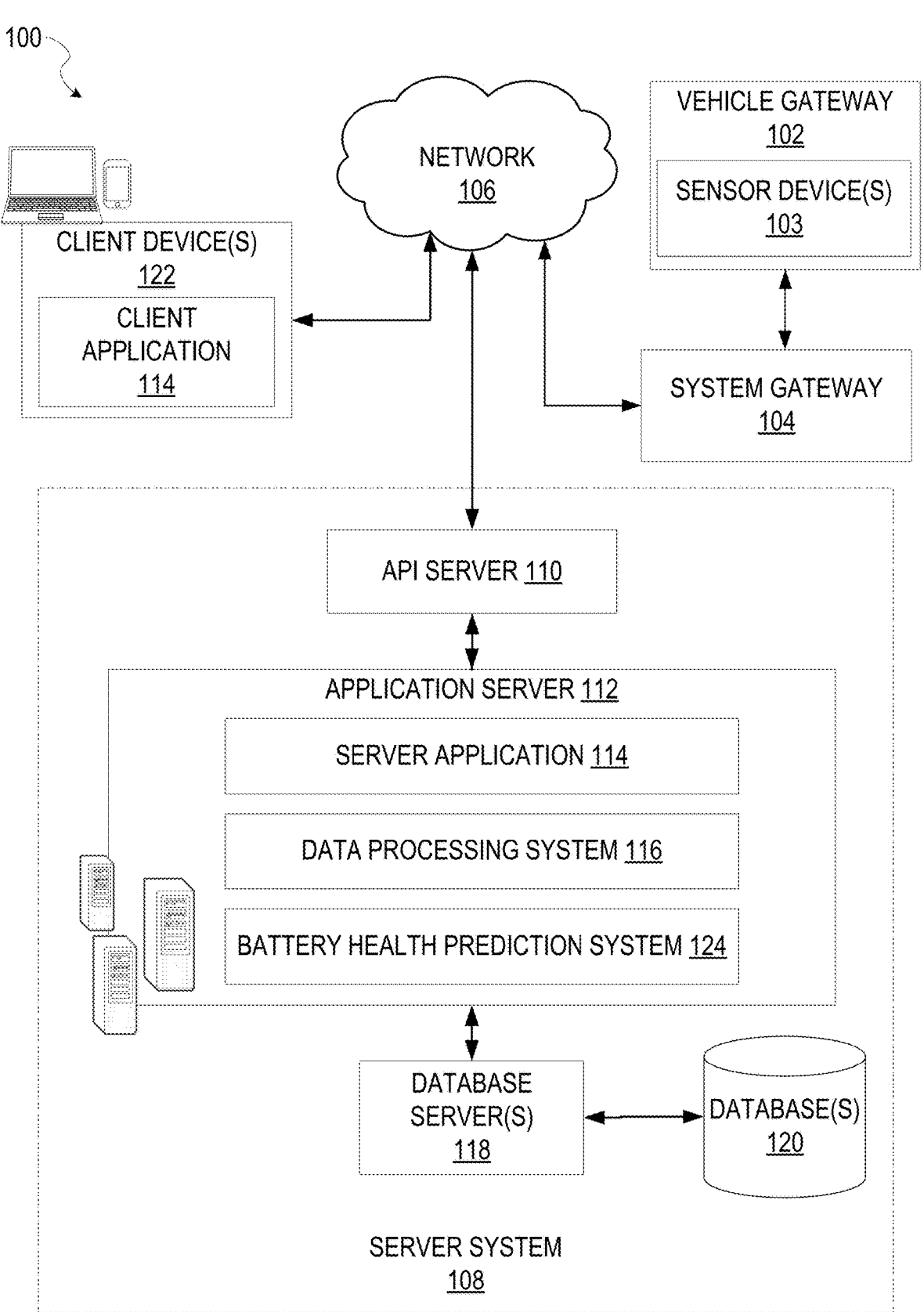
FIG. 1 is a block diagram showing an example system for battery health prediction, according to certain examples.

Vehicle battery failures are a significant problem in commercial vehicle fleets, representing the number one cause of breakdowns for many operators. When a battery fails while a vehicle is in the field, the costs of towing, remote battery replacement, and lost productivity can be significantly higher than addressing battery issues proactively through preventative maintenance. However, existing approaches to battery health monitoring rely on manual load testing of batteries, which is time-consuming and can only identify issues after significant battery deterioration has occurred.

According to certain examples, a Battery Health Prediction System provides methods and systems for predictively detecting battery failures before they occur, enabling fleet operators to perform preventative maintenance. The system continuously monitors battery voltage data and analyzes patterns during key events like engine starts to assess battery health and predict potential failures.

In some examples, the system maintains a rolling buffer of voltage data collected from vehicles. This rolling buffer maintains a predefined period of voltage readings to enable analysis of battery behavior over extended periods of time. The system monitors for engine state transitions from off to on, which serve as indicators of engine crank events that stress the battery.

When an engine state transition is detected, the system analyzes the voltage data from the rolling buffer for a predetermined time period (e.g., 30 seconds) preceding the transition. This analysis focuses on identifying the minimum voltage value reached during the engine crank event, as declining minimum voltages during cranking are indicative of battery deterioration.

In some examples, the system performs comparisons of the identified minimum voltage values against predetermined threshold values that indicate potential battery issues. These thresholds may be dynamically adjusted based on environmental factors like temperature, which may impact battery performance.

Based on these comparisons, the system generates and displays alerts to vehicle operators and fleet managers when battery issues are detected. These alerts can indicate both immediate concerns, like an impending battery drain within 72 hours, and longer-term issues like battery deterioration that will require replacement. For example, the system may employ distinct analytical approaches for different battery conditions. For battery drain detection, the system may use time series analysis of voltage data collected at regular intervals (e.g., every 2 minutes) to predict when voltage will drop below operational thresholds. For battery deterioration detection, the system may analyze high-frequency voltage data during engine crank events to assess the battery's ability to maintain voltage under load, indicating the health of the battery chemistry itself.

In some examples, the system performs predictive analysis by detecting patterns like consecutive low voltage readings during engine-off periods. When such patterns are detected, the system initiates enhanced monitoring and generates time-series models to predict future voltage values and estimate time until potential battery failure.

In some examples, the system collects high-frequency (e.g., 10 Hz) voltage data during engine crank events to ensure accurate capture of minimum voltages. This high-resolution data enables more precise assessment of battery health, as lower frequency sampling often fails to capture the true voltage drop during the brief crank event.

In some examples, the system can be customized based on vehicle characteristics like make, model, and year, allowing threshold values and prediction models to be tailored to specific vehicle types.

Multiple analysis approaches are supported, including survival models that predict expected time to failure and time series models that forecast voltage curves. These different approaches enable flexible deployment based on customer needs and data availability.

The system may be integrated with existing fleet maintenance systems, allowing predicted battery issues to be automatically added to work orders for preventative maintenance.

In some examples, in addition to battery drain prediction, the system provides deteriorated battery detection using crank voltage analysis. During engine start events, the system collects high-frequency voltage data (e.g., 10 Hz) to capture the minimum voltage reached during the brief crank period. Deteriorated batteries exhibit progressively lower minimum voltages during cranking as the battery chemistry degrades and loses its ability to maintain voltage under the high current load required for engine starting.

For example, the system may analyze trends in crank voltage over multiple engine start events to identify batteries whose chemistry has deteriorated. Unlike drained batteries that may recover with charging, deteriorated batteries require replacement as their chemical composition can no longer effectively store and deliver electrical energy.

FIG. 1 is a block diagram showing an example system 100 for battery health prediction, according to certain examples. The system 100 includes a vehicle gateway 102 with sensor devices 103, client devices 122 that host client applications 114, and a server system 108 connected via a network 106.

The client applications 114 communicate and exchange data with the server system 108 via the network 106. The data exchanged includes voltage data from vehicles, environmental data, and battery health alerts generated by the battery health prediction system 124.

The server system 108 provides server-side functionality via the network 106 to client applications 114 and to the vehicle gateway 102 and system gateway 104. While certain functions are described as being performed by specific components, the location of functionality between client applications 114, vehicle gateway 102, system gateway 104, or server system 108 may be adjusted based on processing requirements and technical considerations.

The server system 108 supports various battery monitoring and prediction operations. Such operations include processing voltage data, analyzing engine state transitions, and predicting potential battery failures. The vehicle gateway 102 includes sensor devices 103 configured to collect voltage data from vehicles. Data exchanges within the system 100 are controlled through graphical user interfaces (GUIs) of the client applications 114.

The server system 108 includes an Application Program Interface (API) server 110 coupled to an application server 112. The application server 112 connects to a database server 118, which facilitates access to databases 120 storing voltage data, environmental data, and battery health alerts processed by the application server 112.

The API server 110 receives and transmits data between client devices 122 and the application server 112. The API server 110 provides interfaces that can be called by client applications 114 to invoke functionality of the application server 112, including voltage data processing and battery health prediction functions.

The application server 112 hosts several applications and subsystems, including a server application 114 and a battery health prediction system 124. The battery health prediction system 124 is configured to maintain rolling buffers of voltage data, analyze engine state transitions, predict potential battery failures, and generate alerts based on voltage thresholds. Further details of the battery health prediction system 124 can be found in FIG. 2.

Figure 2:
FIG. 2 is a block diagram illustrating components of the battery health prediction system that configure the system to perform operations for predicting vehicle battery failures, according to certain examples.

FIG. 2 is a block diagram 200 illustrating components of the battery health prediction system 124 that configure the system to perform operations for predicting vehicle battery failures, according to certain examples. The battery health prediction system 124 includes multiple modules configured to perform specialized functions related to processing voltage data and generating battery health alerts.

The data collection module 202 is configured to maintain rolling buffers of voltage data and other operational data from vehicles, including but not limited to environmental data, temperature readings, vehicle usage patterns, make/model/year information, and geographical location data. As well as engine state transitions. The module interfaces with vehicle sensors through the vehicle gateway 102 and sensor devices 103 to collect voltage readings, particularly during engine crank events. For example, through high-frequency sampling at 10 Hz, the data collection module 202 may capture precise minimum voltage values during brief crank events. The module continuously maintains a 96-hour rolling buffer to provide historical data for battery health analysis.

The analysis module 204 processes the collected voltage data to assess battery health. This module analyzes voltage patterns during engine state transitions to identify minimum voltage values reached during crank events. For example, the module can track trends in minimum voltage values across multiple engine starts to detect battery deterioration patterns.

In some examples, the analysis module 204 is configured to determine and communicate specific reasons why a vehicle may fail to start by analyzing multiple data sources to identify root causes of starting failures, enabling customers to take appropriate corrective actions rather than generic troubleshooting approaches. For example, the analysis module 204 may evaluate starter motor performance by monitoring start current requirements and crank patterns within the collected voltage data. The module may detect unusually high start current needed during recent starts, and identify upward trends in start current over time, and count oscillations in voltage data to determine the number of cranks required, and track upward trends in crank frequency that indicate starter motor deterioration.

In some examples, the analysis module 204 distinguishes between external battery loads and internal battery deterioration through load testing analysis of the collected voltage data. When the vehicle gateway camera activation creates a "mini load test" that reveals healthy battery performance, the analysis module 204 determines that rapid battery drain results from external loads such as headlights or other devices left connected to the vehicle battery rather than battery chemistry issues.

The prediction module 206 determines projected battery failure timelines through analysis of historical voltage data combined with other relevant data sources. This module generates models using historical voltage data along with environmental factors, vehicle characteristics, operational patterns, and other supplementary data to predict future voltage values and estimate time until potential battery failure.

In some examples, the prediction module 206 monitors charging performance for alternator failure detection by observing starting voltage levels upon engine shutdown. When vehicles consistently start at lower voltages than typical following engine-off events, the prediction module 206 identifies potential alternator failure where the battery is not receiving adequate charge during operation.

The alert generation module 208 creates battery health indicators and warnings based on detected voltage patterns and threshold comparisons. This module generates alerts when voltage values indicate potential battery issues, displays predicted time periods until battery failure, and enables integration with fleet maintenance systems. The module can adjust alert thresholds based on vehicle characteristics to improve prediction accuracy.

The processors 210 execute instructions to implement the functionality of the various modules described above. The processors coordinate the flow of data between modules and manage system resources to ensure efficient operation of the battery health prediction system 124. The processors also handle communication with vehicle systems and user interfaces for processing voltage data, generating predictions, and delivering battery health alerts.

In some examples, the battery health prediction system 124 may be configured for deployment on vehicle gateway devices rather than cloud-based processing. The prediction module 206 and analysis module 204 can be implemented with reduced computational requirements suitable for edge deployment, enabling real-time battery health assessment without requiring data transmission to remote servers.

FIG. 3 is a flowchart 300 depicting a method of battery health prediction performed by the battery health prediction system 124 and its component modules, according to certain examples. The method includes operations for monitoring voltage data, analyzing engine state transitions, and generating alerts based on battery health predictions.

At operation 302, the data collection module 202 maintains a rolling buffer of voltage data from a vehicle. For example, the data collection module 202 may interface with the vehicle gateway 102 and sensor devices 103 to collect voltage readings at configurable sampling frequencies. The collected data is transmitted through the network 106 to the server system 108, where it is stored in databases 120 accessible through database server 118.

For example, the data collection module 202 may maintain a rolling buffer spanning multiple days of historical voltage data, such as 96 hours, enabling comprehensive analysis of battery behavior patterns. The module continuously collects and updates this data even during vehicle power-off states to ensure complete coverage of battery performance.

In some examples, the voltage data is collected alongside relevant environmental and vehicle data stored in databases 120, which may include temperature readings, vehicle usage patterns, make/model/year specifications, geographical location data, altitude information derived from GPS coordinates, humidity levels, and other operational metrics that can impact battery performance and prediction accuracy.

The data collection module 202 coordinates with other system components through the API server 110 and application server 112 for data storage and retrieval. For instance, when high-frequency sampling is needed during specific events like engine cranks, the module can temporarily increase its sampling rate while maintaining normal sampling frequencies during regular operation to optimize system resources.

At operation 304, the system detects an engine state transition from off to on through the vehicle gateway 102 and sensor devices 103. The analysis module 204 processes engine state data received through the network 106 and stored in databases 120 to identify transition events.

At operation 306, the analysis module 204 analyzes the voltage data from the rolling buffer for a predetermined time period preceding the detected engine state transition. For example, the module examines 30 seconds of pre-transition data, with some examples using high-frequency (e.g., 10 Hz) sampling to ensure accurate capture of voltage patterns during brief crank events.

At operation 308, the analysis module 204 identifies a minimum voltage value from the analyzed voltage data. This minimum value may for example occur during the engine crank event, when the battery experiences its highest load. The module tracks these minimum values across multiple engine starts to detect patterns of battery deterioration.

At operation 310, the prediction module 206 performs a comparison of the minimum voltage value against a predetermined threshold voltage value. In some example, the thresholds can be dynamically adjusted based on environmental factors like temperature and vehicle-specific characteristics. The module may also generate time series models to predict future voltage values and estimate time until potential battery failure.

At operation 312, the alert generation module 208 causes display of an alert based on the comparison. The alert may indicate immediate concerns like impending battery drain within some predicted period of time (e.g., 72 hours) or longer-term issues like battery deterioration requiring replacement. In some examples, these alerts may be automatically integrated into fleet maintenance work orders.

FIG. 4 is a flowchart 400 depicting a method of tracking voltage trends performed by the battery health prediction system 124, according to certain examples.

At operation 402, the analysis module 204 tracks trends of minimum voltage values across multiple engine state transitions. In some examples, the analysis module 204 analyzes historical voltage data stored in databases 120 to identify patterns in how batteries perform during repeated crank events. For example, through the vehicle gateway 102 and sensor devices 103, the system collects voltage readings during each engine start, with particular focus on the minimum voltage reached during the brief crank period.

At operation 404, the alert generation module 208 generates alerts based on the identified voltage trends. For example, when the system detects certain patterns, such as consistently decreasing minimum voltages during cranks, it triggers alerts through the API server 110 and application server 112. These alerts can take multiple forms depending on the severity and timeframe of the detected issue. For immediate concerns, like an impending battery drain within a predicted timeframe (e.g., 72 hours), the system generates urgent notifications. For longer-term trends indicating gradual battery deterioration, the system may recommend proactive maintenance through integration with fleet management systems.

In some examples, the alert generation process incorporates various analytical approaches stored and executed through the server system 108. This includes survival models that predict expected time to battery failure, time series models that forecast voltage curves, and pattern analysis of voltage responses during high-load events. The system may customize these alerts based on vehicle-specific characteristics stored in databases 120, such as make, model, and year, as well as environmental factors like temperature that affect battery performance.

FIG. 5 is a flowchart 500 depicting a method of generating time series predictions performed by the battery health prediction system 124, according to certain examples. For example, the method may use historical voltage data collected during regular monitoring intervals to predict when a battery will drain.

At operation 502, the prediction module 206 generates a time series model using historical voltage data from the rolling buffer. The prediction module 206 accesses voltage data stored in databases 120 through database server 118 to analyze patterns in battery performance over time. For example, the system processes the history of voltage readings collected through the vehicle gateway 102 and sensor devices 103 to establish baseline performance patterns. The time series modeling incorporates multiple data frequencies, for example from 2-minute sampling during regular operation to high-frequency (e.g., 10 Hz) sampling during critical events like engine cranks.

At operation 504, the prediction module 206 predicts future voltage values using the time series model. Through the application server 112, the module applies analytical techniques to forecast how battery voltage is likely to change over time based on observed patterns and trends. The system generates predicted voltage curves that account for various factors stored in databases 120, including typical usage patterns, environmental conditions like temperature, and historical battery performance data.

At operation 506, the prediction module 206 determines a predicted time period until battery drain based on the predicted future voltage values. The module analyzes where the forecasted voltage curves intersect with critical threshold values that indicate potential battery drain, such as the 11V threshold for starting capability. When the system predicts voltage will drop below these thresholds within a configurable time period, such as 72 hours, it initiates alert generation through the alert generation module 208. The prediction timeframes can be customized based on vehicle-specific characteristics and operational requirements stored in databases 120, with the system continuously refining its predictions based on actual outcomes to improve accuracy.

FIG. 6 is a flowchart 600 depicting a method of initiating predictive analysis performed by the battery health prediction system 124, according to certain examples.

At operation 602, the data collection module 202 detects consecutive voltage readings below a monitoring threshold during an engine-off state. Through the vehicle gateway 102 and sensor devices 103, the system continuously monitors voltage levels while the engine is off, with readings stored in databases 120. In some examples, when the system detects multiple consecutive voltage readings falling below a configurable monitoring threshold, such as 12.3V, it identifies a potential battery health concern.

At operation 604, the prediction module 206 initiates a predictive analysis of the voltage data in response to detecting the consecutive voltage readings. Through the application server 112, the module begins processing the historical voltage data stored in databases 120 to assess battery health trends. The predictive analysis may incorporate multiple analytical approaches, including time series modeling of voltage patterns and analysis of voltage behavior during previous engine crank events. The system may increase data collection frequency during this analysis period to gather more detailed information about battery performance.

At operation 606, the prediction module 206 determines a predicted time period until battery failure based on the predictive analysis. The module processes the collected data through various analytical models to estimate when the battery voltage may decline below critical thresholds that would prevent vehicle operation, such as 11V. This prediction may consider multiple factors stored in databases 120, including historical voltage patterns, environmental conditions like temperature, and vehicle-specific characteristics. When the analysis indicates potential battery failure within a configurable timeframe, such as 72 hours, the system triggers alert generation through the alert generation module 208 to enable proactive maintenance before a failure occurs.

Figure 7:
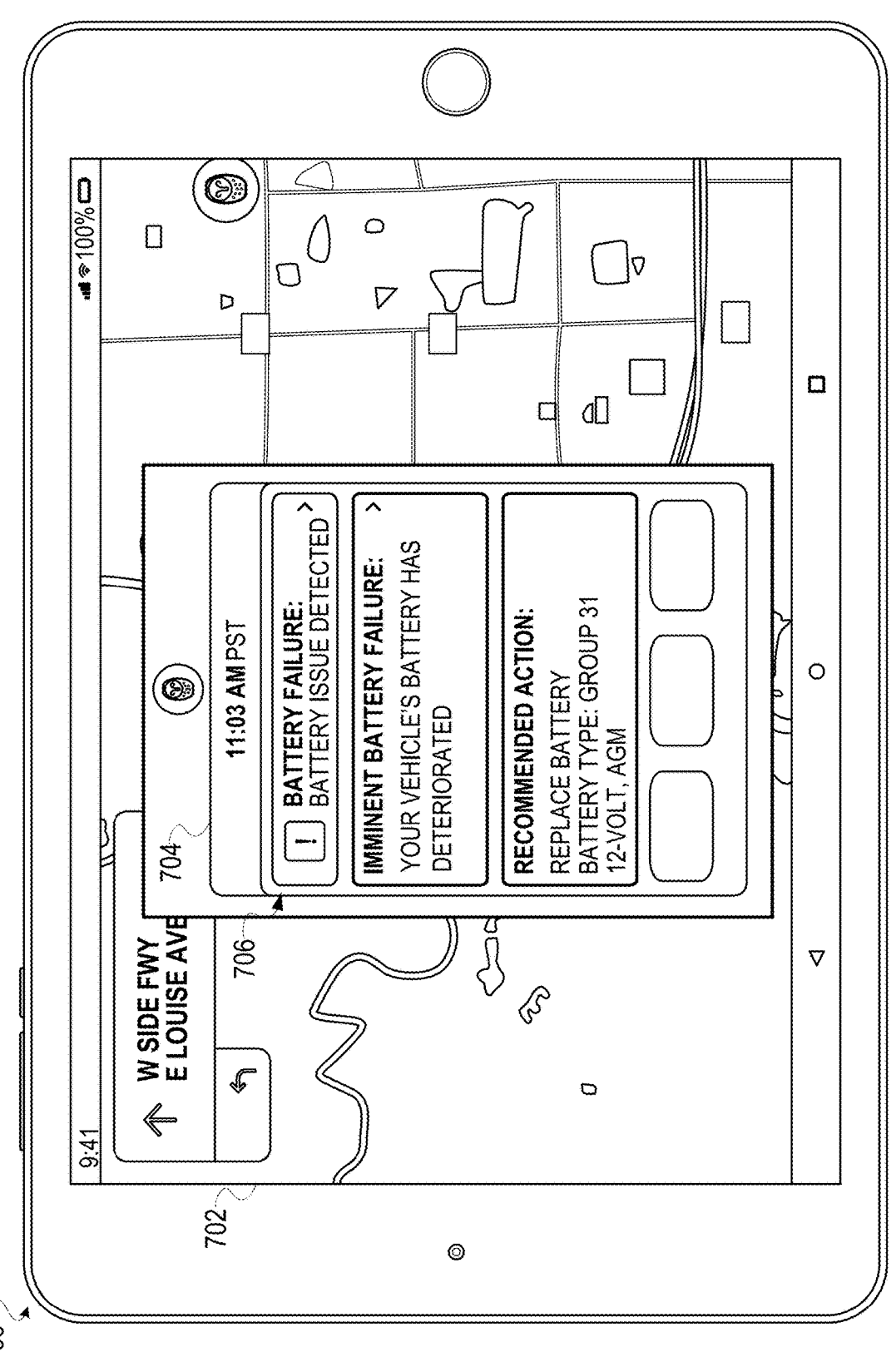
FIG. 7 is an interface diagram depicting a graphical user interface (GUI) depicting an example battery health alert displayed by the battery health prediction system 124, according to certain examples

FIG. 7 is an interface diagram 700 depicting a graphical user interface (GUI) 702 depicting an example battery health alert 704 displayed by the battery health prediction system 124, according to certain examples.

As seen in the interface diagram 700, the notification 704 contains an alert 706 that warns users about impending battery issues detected by the battery health prediction system 124. For example, the alert may indicate "BATTERY FAILURE: LOW VOLTAGE DETECTED" followed by "IMMINENT BATTERY FAILURE: YOUR VEHICLE'S BATTERY HAS DETERIORATED." This predictive warning is generated based on analysis performed by the prediction module 206 using voltage data stored in databases 120, as discussed above in the methods 500 and 600 of FIGS. 5 and 6.

Additional vehicle details 708 provide contextual information to help maintenance personnel address the detected issue. For example this section may include "RECOMMENDED ACTION: REPLACE BATTERY" along with specific battery information such as "BATTERY TYPE: GROUP 31, 12-VOLT, AGM." The system pulls this information from databases 120 based on the vehicle's characteristics and operational history, enabling maintenance teams to quickly identify and procure the correct replacement components.

Figure 8:
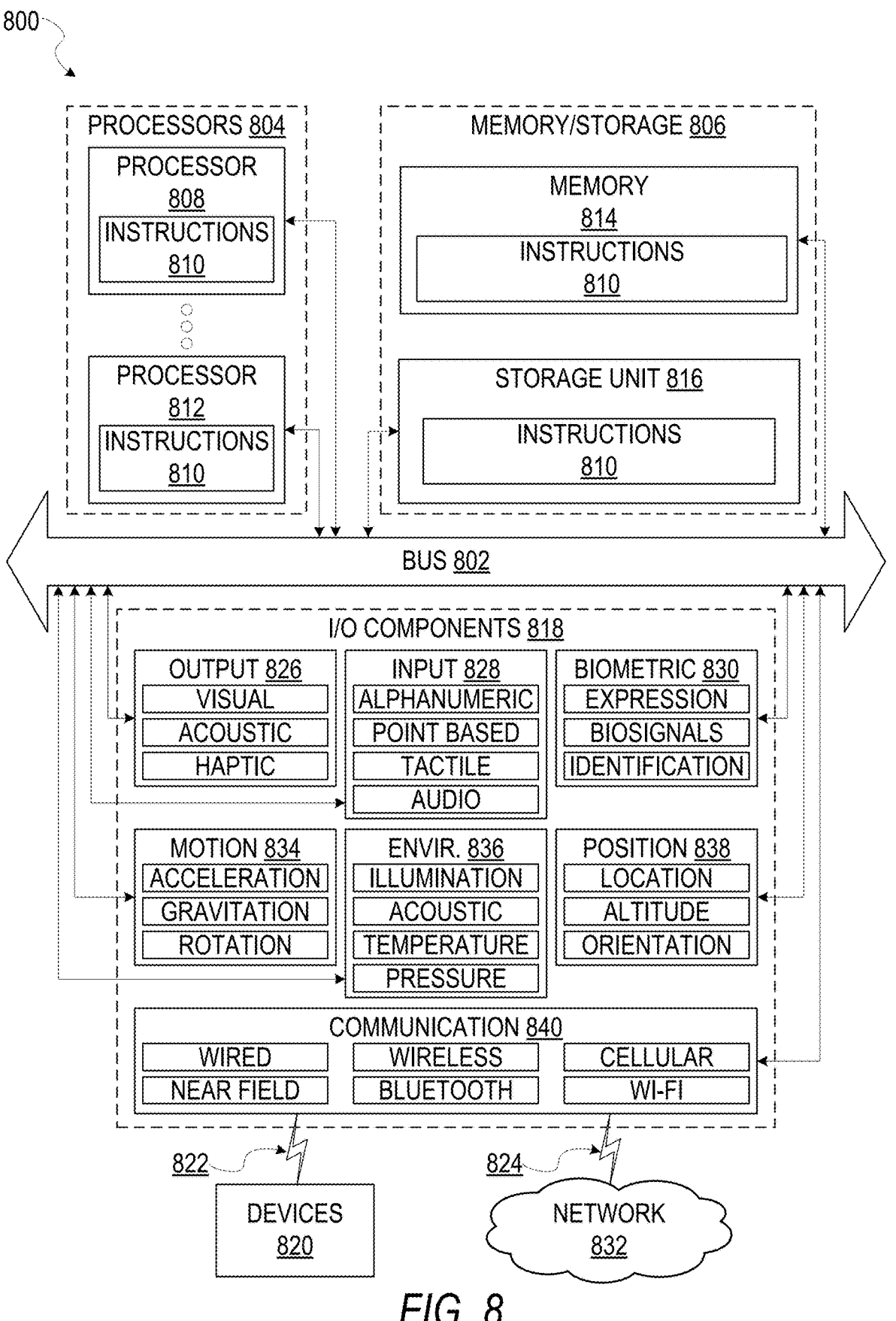
FIG. 8 is a block diagram illustrating components of a machine, including processors, memory/storage, I/O components, and communication capabilities able to perform the collision detection methodologies, according to certain examples.

FIG. 8 is a block diagram illustrating components of a machine 800, according to some example embodiments, able to read instructions from a machine-readable storage medium and perform the methodologies for battery health prediction discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform battery health prediction may be executed. The instructions 810 transform the general, non-programmed machine 800 into a particular machine 800 programmed to maintain voltage data buffers, analyze engine state transitions, predict battery failures, and generate battery health alerts. In a networked deployment, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 810, sequentially or otherwise, that specify actions to be taken by machine 800.

The machine 800 includes processors 804 that execute instructions for the battery health prediction system 124, including the data collection module 202, analysis module 204, prediction module 206, and alert generation module 208. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 include components configured to receive voltage data, environmental data, and sensor data from vehicle gateways and devices. The specific I/O components 818 that are included in a particular machine 800 will depend on the type of machine. For example, portable machines such as mobile phones will likely include a touch input device or other such input mechanisms, while a headless server machine will likely not include such a touch input device. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 are configured to receive voltage data, environmental data, and sensor data for battery health prediction.

The I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 include GPS receivers for tracking vehicle locations associated with the sensor data.

Communication may be implemented using a wide variety of technologies. The I/O components 818 may include communication components 840 operable to couple the machine 800 to a network 832 or devices 820 via coupling 822 and coupling 824 respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a Universal Serial Bus (USB)). The communication components support transmission of voltage data, environmental data, battery health predictions, and alerts between system components.

The communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting a NFC beacon signal that may indicate a particular location, and so forth. The components enable real-time processing of voltage data, generation of battery health predictions, detection of potential battery failures, and delivery of battery health alerts across vehicle fleets.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:
maintaining a rolling buffer of voltage data collected from a vehicle;
detecting an engine state transition from off to on;
analyzing a portion of the voltage data from a predetermined time period from within the rolling buffer that precedes the detected engine state transition;
identifying a minimum voltage value from the portion of the voltage data;
performing a comparison of the minimum voltage value against a predetermined threshold voltage value;
determining a predicted time period until battery failure based on the voltage data; and
causing display of an alert based on the comparison, the alert including a display of the predicted time period until battery failure.

2. The method of claim 1, further comprising:
tracking a trend of minimum voltage values across multiple engine state transitions; and
generating the alert based on the trend.

3. The method of claim 1, wherein the rolling buffer maintains voltage data for a configurable time period.

4. The method of claim 1, further comprising:
obtaining environmental data associated with the vehicle; and
adjusting the predetermined threshold voltage value based on the environmental data.

5. The method of claim 1, further comprising:
obtaining temperature data for a location of the vehicle; and
adjusting the predetermined threshold voltage value based on the temperature data.

6. The method of claim 1, wherein the determining the predicted time period until battery failure further comprises:
generating a time series model based on the voltage data from the rolling buffer;
predicting future voltage values using the time series model; and
determining the predicted time period until battery failure based on the predicted future voltage values.

7. The method of claim 1, further comprising:
detecting consecutive voltage readings below a monitoring threshold during an engine-off state;
initiating a predictive analysis of the voltage data in response to detecting the consecutive voltage readings; and
determining a predicted time period until battery failure based on the predictive analysis.

8. A system comprising:
one or more computer processors;
one or more computer memories; and
a set of instructions incorporated into the one or more computer processors, the set of instruction configuring the one or more computer processors to perform operations comprising:
maintaining a rolling buffer of voltage data collected from a vehicle;
detecting an engine state transition from off to on;

analyzing a portion of the voltage data from a predetermined time period from within the rolling buffer that precedes the detected engine state transition;

identifying a minimum voltage value from the portion of the voltage data;

performing a comparison of the minimum voltage value against a predetermined threshold voltage value;

determining a predicted time period until battery failure based on the voltage data; and causing display of an alert based on the comparison, the alert including a display of the predicted time period until battery failure.

9. The system of claim 8, further comprising:

tracking a trend of minimum voltage values across multiple engine state transitions; and generating the alert based on the trend.

10. The system of claim 8, wherein the rolling buffer maintains voltage data for a configurable time period.

11. The system of claim 8, further comprising:

obtaining environmental data associated with the vehicle; and adjusting the predetermined threshold voltage value based on the environmental data.

12. The system of claim 8, further comprising:

obtaining temperature data for a location of the vehicle; and adjusting the predetermined threshold voltage value based on the temperature data.

13. The system of claim 8, wherein the determining the predicted time period until battery failure further comprises:

generating a time series model based on the voltage data from the rolling buffer;

predicting future voltage values using the time series model; and determining the predicted time period until battery failure based on the predicted future voltage values.

14. The system of claim 8, further comprising:

detecting consecutive voltage readings below a monitoring threshold during an engine-off state;

initiating a predictive analysis of the voltage data in response to detecting the consecutive voltage readings; and determining a predicted time period until battery failure based on the predictive analysis.

15. A non-transitory machine-readable storage medium comprising instructions that, when executed by one or more processors of a machine, cause the machine to perform operations comprising:

maintaining a rolling buffer of voltage data collected from a vehicle;

detecting an engine state transition from off to on;

analyzing a portion of the voltage data from a predetermined time period from within the rolling buffer that precedes the detected engine state transition;

identifying a minimum voltage value from the portion of the voltage data;

performing a comparison of the minimum voltage value against a predetermined threshold voltage value;

determining a predicted time period until battery failure based on the voltage data; and causing display of an alert based on the comparison, the alert including a display of the predicted time period until battery failure.

16. The non-transitory machine-readable storage medium of claim 15, further comprising:

tracking a trend of minimum voltage values across multiple engine state transitions; and generating the alert based on the trend.

17. The non-transitory machine-readable storage medium of claim 15, wherein the rolling buffer maintains voltage data for a configurable time period.

18. The non-transitory machine-readable storage medium of claim 15, further comprising:

obtaining environmental data associated with the vehicle; and adjusting the predetermined threshold voltage value based on the environmental data.

* * * * *